(12) United States Patent
Hillyard et al.

(10) Patent No.: US 8,869,154 B1
(45) Date of Patent: Oct. 21, 2014

(54) CONTROLLING PROCESSOR USAGE ON A COMPUTING DEVICE

(75) Inventors: Paul Byron Hillyard, Lindon, UT (US); Rob Thomas Bradshaw Fotheringham, Cedar Hills, UT (US)

(73) Assignee: Crimson Corporation, Dover, DE (US)

( * ) Notice: Subject to any disclaimer, the term of this patent is extended or adjusted under 35 U.S.C. 154(b) by 661 days.

(21) Appl. No.: 12/748,873

(22) Filed: Mar. 29, 2010

(51) Int. Cl.
*G06F 9/46* (2006.01)
*G06F 9/48* (2006.01)

(52) U.S. Cl.
CPC .............. *G06F 9/4881* (2013.01); *G06F 9/485* (2013.01)
USPC ............................ 718/102; 718/103; 718/108

(58) Field of Classification Search
CPC ...... G06F 9/5022; G06F 9/4881; G06F 9/485
See application file for complete search history.

(56) References Cited

U.S. PATENT DOCUMENTS

| 5,404,536 | A * | 4/1995 | Ramakrishnan et al. ...... 710/220 |
| 6,754,690 | B2 * | 6/2004 | Larson .......................... 718/102 |
| 6,834,386 | B1 * | 12/2004 | Douceur et al. ............... 718/107 |
| 6,874,074 | B1 * | 3/2005 | Burton et al. ................. 711/170 |
| 2004/0249944 | A1 * | 12/2004 | Hosking et al. ............... 709/225 |
| 2005/0166204 | A1 * | 7/2005 | Takatsu et al. ................ 718/100 |
| 2007/0011661 | A1 * | 1/2007 | Itoh .............................. 717/127 |

\* cited by examiner

*Primary Examiner* — Camquy Truong
(74) *Attorney, Agent, or Firm* — Austin Rapp & Hardman

(57) ABSTRACT

A method for controlling processor usage on a computing device is described. The method includes identifying targeted processes and obtaining a total processor usage for a processor on the computing device. The method also includes determining an amount of time to suspend threads within the targeted processes and suspending the threads for the determined amount of time.

21 Claims, 13 Drawing Sheets

CONTROLLING PROCESSOR USAGE ON A COMPUTING DEVICE

TECHNICAL FIELD

The present disclosure relates generally to computers and computer-related technology. More specifically, the present disclosure relates to controlling processor usage on a computing device.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. One or more servers may provide data, services and/or may be responsible for managing other computers on a network. The managed computers are often referred to as nodes. A computer network may have hundreds or even thousands of managed nodes.

Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. This computer hardware is often upgraded and replaced with new components. Computer software is also frequently upgraded or replaced. Furthermore, computer systems may need to be scanned in order to detect and mitigate security threats.

A computing device may need to accomplish a maintenance task concurrently with other tasks. Thus, computing resources may be divided to accomplish the maintenance task along with the other tasks. Processing of the other tasks may be slowed as a result, thereby possibly degrading the end-user experience.

As shown from the above discussion, there is a need for systems and methods that will improve the ability to control processor usage on a computing device. Improved systems and methods may enable a computing device to accomplish concurrent tasks while mitigating or avoiding a negative end-user experience.

DETAILED DESCRIPTION

Figure 1:
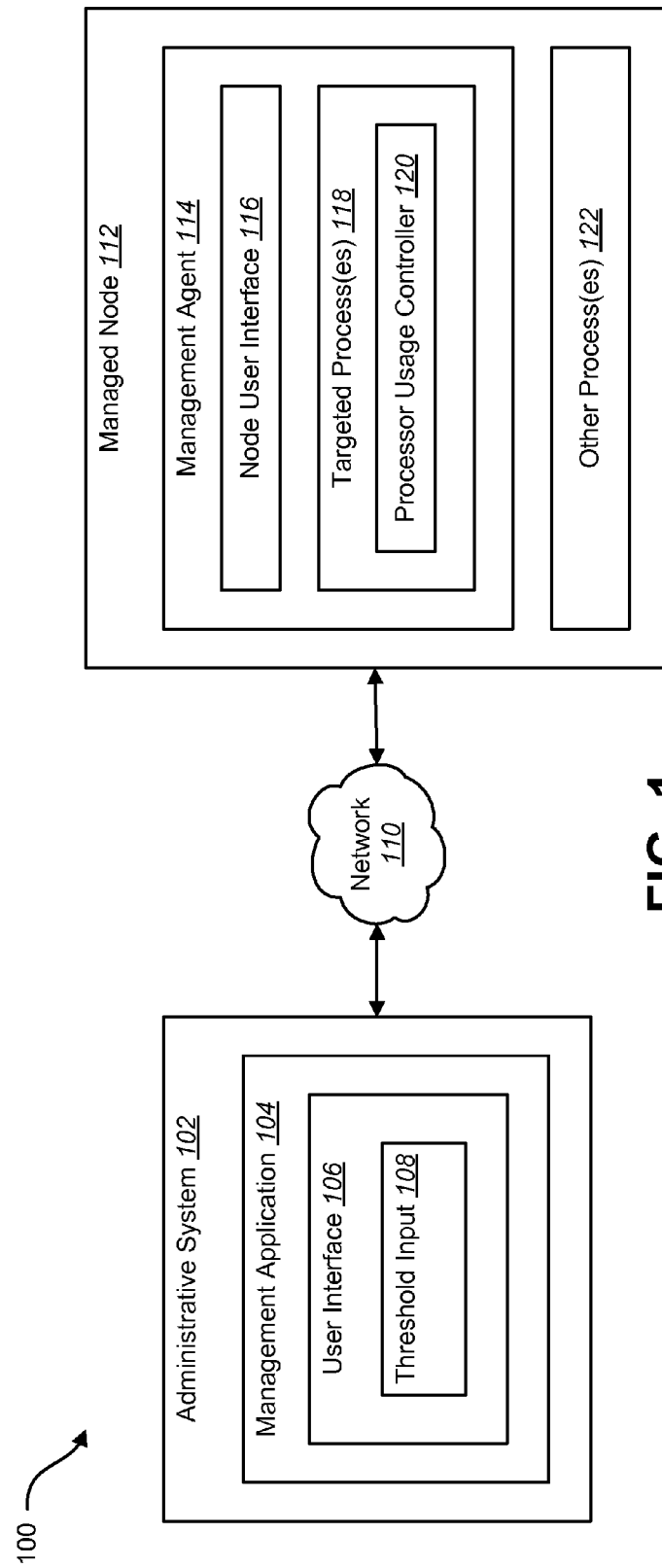
FIG. 1 is a block diagram that illustrates one configuration of a managed network in which a system for controlling processor usage on a computing device may be implemented.

Frequently during login or shortly after the startup of a computing device, background applications may be initiated by a local scheduler. For example, vulnerability or security threat scanners, inventory (e.g., applications, files, etc.) scanners and other processes may begin to run. These tasks may have been waiting to run until certain "desktop" criteria are met, which criteria might include the requirement that a user be logged in. Thus, a burst of process activity may occur at login time. At the same time, other operating system processes may also be launched, which may cause other processes to appear sluggish or slow. Perceived or actual sluggish or slow performance may cause a poor usability experience for the user. The poor usability experience may be even worse for the user of a laptop computer, since its processor may run at a slower clock rate when unplugged. This performance issue may even prompt a user to contact computer support personnel in an attempt to resolve the issue.

Typical solutions in the past may have included lowering process thread priority, or adding "sleeps" to certain code paths during scanning. This technique may be inaccurate, since not all threads in an application may be controlled by the application developer. More specifically, some threads may be created by third-party software components used by the developer and may not be controlled with sleeps or thread priority adjustments. Furthermore, arbitrary sleep intervals may be effective for some performance categories of computing devices but less effective for others. Also, lowering the thread priority may not remove an "appearance of guilt" for a busy thread if no other processes are currently using the processor. In other words, even a low-priority thread that is running may cause the owning process to appear to be a "processor hog" in a task manager. This may also prompt a user to contact computer support personnel or even to terminate the process.

Systems and methods for controlling processor usage on a computing device are disclosed. A dynamic processor usage limiting component may allow targeted software components to operate only within the amount of a total processor use percentage that an administrator (e.g., user or computer support personnel) deems appropriate. This may ensure that a user's experience regarding computing device performance is not degraded by the operation of administrative, background, or other processes running on the computing device. That is, by carefully controlling the amount of computing device resources that particular applications or processes may use, and especially restricting access in times of high processor utilization, the performance issues experienced by the user may be mitigated. Thus, the perception that a particular application is a "processor hog" may also be alleviated.

A method for controlling processor usage on a computing device is disclosed. The method includes identifying targeted processes and obtaining a total processor usage for the processor on the computing device. The method also includes determining an amount of time to suspend threads within the targeted processes and suspending the threads for the determined amount of time.

The method may also include disregarding threads based on priority and/or threads that are associated with a user interface. The amount of time to suspend the threads may be based on a regular processor usage limit if the total processor usage is not greater than the threshold. The amount of time to suspend the threads may be based on a high processor usage limit if the total processor usage is greater than a threshold.

The method may also include obtaining a processor usage of the targeted processes. The amount of time to suspend the threads may be based on a processor usage limit and the processor usage of the targeted processes if the total processor usage is not greater than the threshold.

The method may also include determining whether the computing device is in a low-use state. Determining the amount of time to suspend the threads may be based on a processor usage limit, whether the computing device is in a low-use state and whether the total processor usage is greater than the threshold.

The method may also include obtaining a process identification of a foreground user interface. Determining the amount of time to suspend the threads may be based on a processor usage limit, whether the threads are associated with the foreground user interface and whether the total processor usage is greater than the threshold.

The targeted processes may not be associated with a foreground user interface. Determining the amount of time to suspend the threads may be based on a processor usage limit and whether the total processor usage is greater than a threshold. The threads may include third-party threads.

A computing device that is configured for controlling processor usage is also disclosed. The computing device includes a processor and instructions stored in memory. The computing device identifies targeted processes and obtains a total processor usage for the processor. The computing device also determines an amount of time to suspend threads within the targeted processes and suspends the threads for the determined amount of time.

A non-transitory tangible computer-readable medium for controlling processor usage on a computing device is also disclosed. The computer-readable medium includes executable instructions for identifying targeted processes and obtaining a total processor usage for the processor. Instructions for determining an amount of time to suspend threads within the targeted processes and suspending the threads for the determined amount of time are also included on the computer-readable medium.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the invention, as claimed, but is merely representative of the various configurations of the systems and methods.

FIG. 1 is a block diagram that illustrates one configuration of a managed network in which a system 100 for controlling processor usage on a computing device may be implemented. An administrative system 102 is connected to a computer network 110, such as a Local Area Network (LAN) or the Internet. The administrative system 102 is used to manage node(s) 112 that are also connected to the computer network 110. These other managed node(s) 112 will be referred to herein as "managed nodes" or "nodes." For simplicity, only a single managed node 112 is shown in the system 100 of FIG. 1. Other configurations of the system 100, however, may include many managed nodes 112.

The administrative system 102 may include a management application 104. The management application 104 may include a User Interface (UI) 106. The management application 104 may be used to manage the managed node(s) 112 via a network 110. The user interface 106 may provide an interface whereby an end-user may control the behavior of the managed node(s) 112 via the management application 104 and/or administrative system 102. The user interface 106 may include a threshold input 108. The threshold input 108 will be discussed in more detail below. The managed node(s) 112 may include a management agent 114 and other software components 122 (shown as other process(es) 122 for convenience). As referred to herein, "software components" may refer to software running on the managed node 112. For example, the term "software components" may refer to process(es) and/or thread(s), but is not limited to process(es) and/or thread(s). The management agent 114 may include a node user interface 116. The management agent may also include targeted software components 118 (shown as targeted process(es) 118 for convenience). The term "process" as used herein is the execution or "instance" of a running computer program. The targeted process(es) 118 may include a processor usage controller 120. The management agent 114 may receive instructions and/or data (e.g., settings) from the management application 104 and/or administrative system 102, including a threshold from the threshold input 108. The processor usage controller 120 may determine whether a particular process is a targeted 118 or other process 122. The processor usage controller 120 may further determine whether a particular process has a specific or default threshold associated with it. If a particular process has neither a specific nor a default threshold, it may be deemed either a process 122 that is not controlled, or it may be deemed a targeted process 118 and allowed to run at a 100% threshold (e.g., effectively no threshold). The management agent 114 may be used to perform maintenance and other tasks on the managed node 112. For example, the management agent 114 may perform software updates, install software, uninstall unwanted or unauthorized software, scan for security threats (e.g., viruses, worms, Trojans, malware, spyware, etc.), scan for other unwanted or unauthorized software (e.g., adware, unauthorized software installed by employees, etc.), or otherwise perform maintenance or other tasks.

The node user interface 116 may indicate to a user the maintenance or other tasks being performed on the managed node 112. The node user interface 116 may (or may not) provide some control of the maintenance or other tasks being performed on the managed node 112. The targeted process(es) 118 are process(es) that have processor usage control. The processor usage controller 120 may be a module that is capable of regulating software component (e.g., process or thread) processor usage. That is, the processor usage controller 120 may control the total amount of processor resources (e.g., cycles) that a particular (i.e., "targeted") process is allowed to use by periodically suspending and resuming individual threads in the targeted process. The processor usage controller 120 may control the processor usage of targeted process(es) 118 while not controlling the processor usage of other process(es) 122.

The threshold input 108 may be a software control. For example, the threshold input 108 may be a slider, a text box, a drop-down list, radio button(s), pushbutton(s), etc. in the user interface 106. By using the user interface 106, users or computer support personnel may modify the activities of the management agent 114 and/or processor usage controller 120. The threshold input 108 may be used to modify the activity of the processor usage controller 120. For example, the threshold input 108 may represent a range of values from 1 to 100. These values may represent percentages of processor resources that a targeted process 118 may be allowed to use or consume. For instance, the managed node 112 may run process(es) 118, 122. By changing the threshold input 108 value, users or computer support personnel may limit the amount of processor resources that the targeted process(es) 118 are allowed to use (e.g., the targeted process 118 may be allowed to use 30% of processor resources) on the managed node 112. The user interface 106 may also include other options in order to configure the processor usage controller 120. For example, users or computer support personnel may designate (i.e., "target") a particular process or processes to regulate. The user interface 106 may be only one part of a user interface that includes other configuration settings for the management agent 114.

Figure 2:
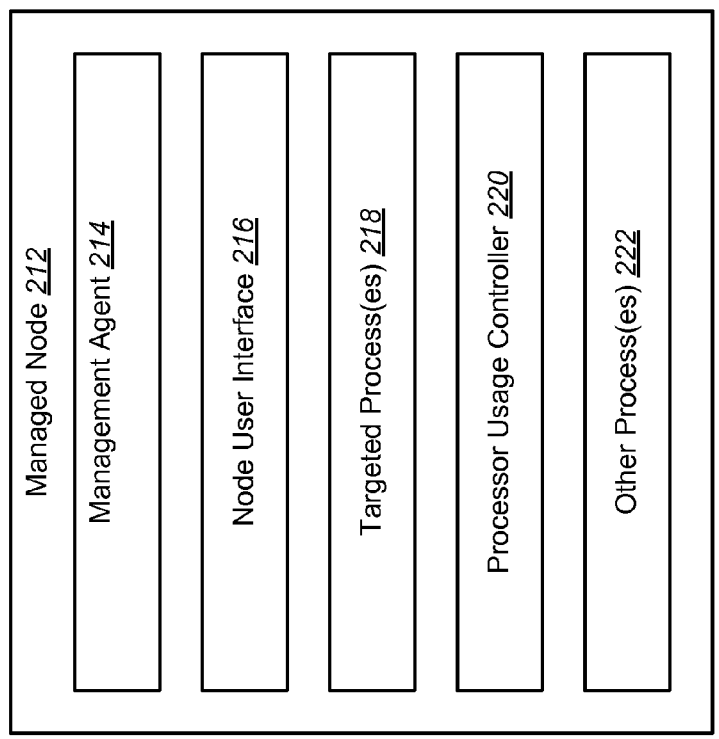
FIG. 2 is a block diagram that illustrates one configuration of a managed node.

FIG. 2 is a block diagram that illustrates one configuration of a managed node 212. The managed node 212 may include a management agent 214 and processor usage controller 220. The managed node 212 may include a node user interface 216. The managed node 212 may have targeted process(es) 218 and other processes 222. As illustrated in the configuration shown in FIG. 2, the processor usage controller 220 may not be included within the targeted processes 218, and may be separate from the management agent 214. For example, the processor usage controller 220 may be a separate process that monitors and controls the targeted process(es) 218. However, the processor usage controller 220 may run in the same user space (e.g., as a thread) as the targeted process 218 or on a local system with the targeted process 218. Therefore, the processor usage controller 120 may be a thread included in targeted processes 118 and/or included in a management agent 114, and may be started in the initialization of a main thread. For example, if the implementor "owns" (e.g., has access to) the source code for the targeted process 218, he may include the source file implementation of the processor usage controller 220 (e.g., the "time sharing component"). The processor usage controller 220 may auto-initialize itself during application startup through global variable definition, for example.

The targeted process(es) 218 may be processes used by or associated with the management agent 214 to perform maintenance or other tasks. The targeted process(es) 218 may alternatively be processes that are not used by nor associated with the management agent 214. In this case, it may be convenient to control the targeted process' 218 thread processor usage from another process (e.g., from the processor usage controller 120 when it is separate from the targeted process(es) 118). However, it is possible to "inject" a dynamic link library (i.e., DLL) containing the processor usage controller 220 into the targeted process' 118 address space.

Examples of targeted process(es) 218 include software programs (e.g., video rendering, compiling, document editing or presentation software, etc.) that a user desires to control the programs' processor usage. The processor usage controller 220 may control the processor usage of targeted process(es) 218 by periodically suspending and resuming (e.g., allowing to run) threads within the targeted process(es) 218. The suspension and resumption of the targeted process(es) 218 may occur at intervals that are small enough to not be noticed by an end user. The managed node 212 may also include other process(es) 222 which are not targeted by the processor usage controller 220 for processor usage control.

In some configurations, the node user interface 216 may be used to configure the behavior of the processor usage controller 220. For example, a user may use the node user interface 216 to designate a particular process as one to be controlled by the processor usage controller. Typically a user would designate a process that is consuming a lot of processor resources. The user may further use the node user interface 216 to designate a threshold for the processor usage controller 220, in a manner similar to the threshold input 108.

Figure 3:
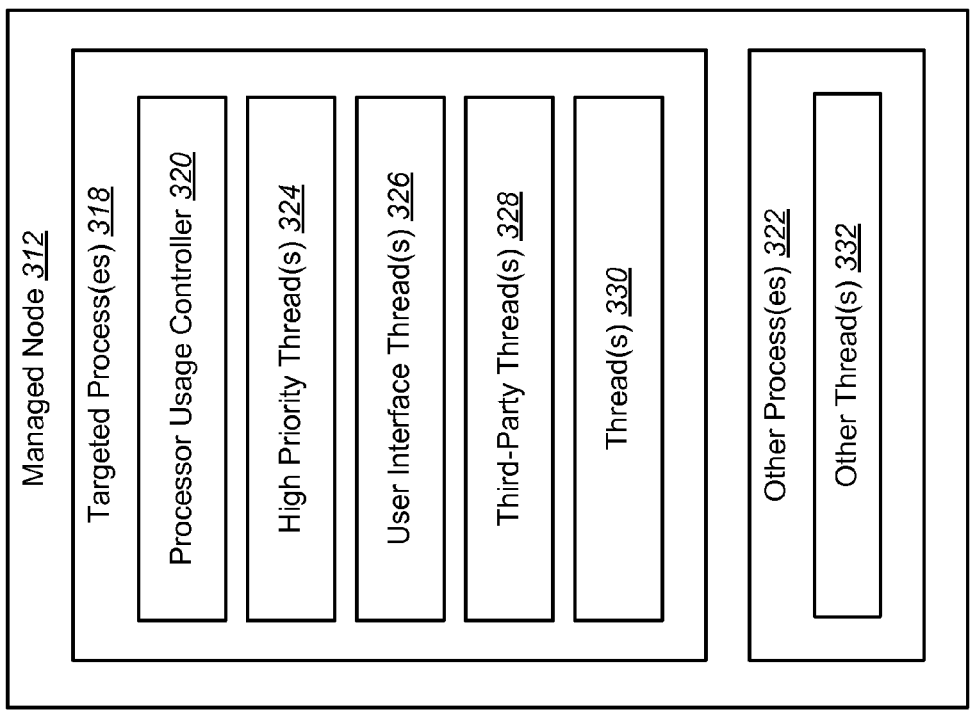
FIG. 3 is a block diagram that illustrates another configuration of a managed node.

FIG. 3 is a block diagram that illustrates another configuration of a managed node 312. The managed node 312 may include targeted process(es) 318 and other process(es) 322. The targeted process(es) 318 may include a processor usage controller 320 and several thread(s) 324, 326, 328, 330. The other process(es) 322 may include other thread(s) 332. The term "thread" as used herein may be a sequence of instructions that are running within a process. Multiple threads may run simultaneously within a single process (e.g., sharing process memory and resource handles). For example, the Microsoft® Windows operating system controls how much time each thread in a process has to run before it is "preempted" by another thread in the process (e.g., or by another process). This preempting may happen many times per second, giving the impression that all threads and process are running simultaneously.

As discussed above, a process may include one or more threads. Threads may operate in the same address space at the same time (e.g., within the process in which they were created), whereas processes each have a unique address space and unique resources. The targeted process(es) 318 may include thread(s) 330, high priority thread(s) 324, and/or user interface (e.g., "window") thread(s) 326. Any of these threads 330, 324, 326 may be application developer code or may alternatively be third-party code (e.g., third-party thread(s) 328) used during the development of an application. The processor usage controller 320 may be configured to periodically suspend certain thread(s) 328, 330 in order to control the processor usage of the targeted process(es) 318. The processor usage controller 320 may typically avoid suspending certain types of thread(s), such as the high or "critical" priority thread(s) 324, and the user interface thread(s) 326. The processor usage controller 320 also avoids suspending itself. The high or "critical" priority thread(s) 324 may be threads that are associated with important tasks, such as network input/output (I/O). The high priority thread(s) 324 may have their own priority set to a maximum priority, for example. The user interface thread(s) 326 may be threads that are associated with user interfaces or windows appearing on the display of a managed node 312. Third-party thread(s) 328 may be threads started as a result of a call from a targeted process 318 to a third-party DLL (dynamically linked library) or to a third-party API (application programming interface). For example, when a targeted process 318 calls third-party software to perform some task, that third-party software may start several threads that are separate from the regular process thread(s) 330, but are nonetheless associated with the targeted process 318 that called them.

The processor usage controller 320 may avoid controlling or suspending high priority thread(s) 324 and/or user interface thread(s) 326. For example, the processor usage controller 320 may avoid suspending high priority thread(s) 324, since suspending them may result in delays that may be important to managed node 312 functionality. Furthermore, the processor usage controller 320 may avoid suspending user interface thread(s) 326 since suspending them may result in a user interface appearing "hung" or "crashed" (i.e., non-responsive) to a user. Since third-party thread(s) 328 may be started by the targeted process(es), it may be beneficial for the processor usage controller 320 to detect and periodically suspend them in order to regulate targeted process 318 processor usage. The processor usage controller 320 may not suspend other thread(s) 332 included in other process(es) 322 in order to control processor usage. However, the processor usage controller 320 may obtain (e.g., sample) the amount of total processor usage by both the targeted process(es) 318 and other process(es) 322 in order to determine when and how much to limit targeted process 318 processor usage.

Thus, some benefits of the systems and methods disclosed herein may include an ability to dig into a process, identify threads that may be suspended and resumed (e.g., "frozen" and "unfrozen") and do it according to some plan to reduce the processor usage of a particular application, particularly when the typical usage of setting thread priority may not seem to affect the user's perceived processor usage of the application when overall processor usage is low.

Figure 4:
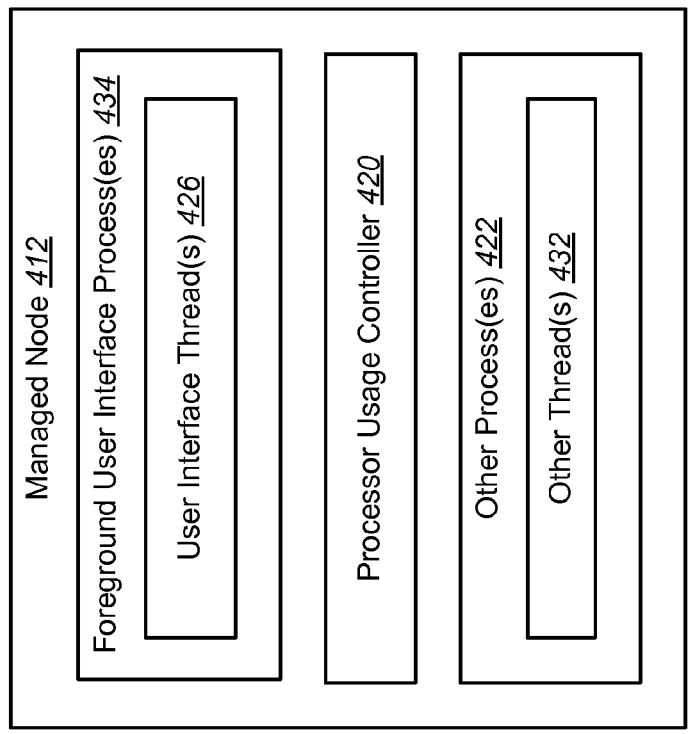
FIG. 4 is a block diagram that illustrates another configuration of a managed node.

FIG. 4 is a block diagram that illustrates another configuration of a managed node 412. The managed node 412 may include a processor usage controller 420. The managed node may include foreground user interface process(es) 434 and other process(es) 422. The foreground user interface process(es) 434 may include user interface thread(s) 426, while the other process(es) 422 may include other thread(s) 432. The foreground user interface process(es) 434 may be a process or processes that are associated with a foreground user interface or window displayed on a managed node 412. The user interface thread(s) 426 may similarly be associated with a foreground user interface or window displayed on a managed node 412. The processor usage controller 420 may detect which process(es) 434 or thread(s) 426 are associated with a foreground user interface. The processor usage controller 420 may allow the foreground user interface process(es) 434 and/or user interface thread(s) 426 to use more processor resources, since a user may currently be interacting with the foreground user interface. That is, the processor usage controller 420 may allow a higher processor usage or effectively no processor usage limit to be placed on the foreground user interface process(es) 434 and/or user interface thread(s) 426. Optionally, the processor usage controller 420 may limit (e.g., allow a low processor usage or more strictly limit) the amount of processor resources that the other process(es) 422 and/or other thread(s) 432 are allowed to use.

Figure 5:
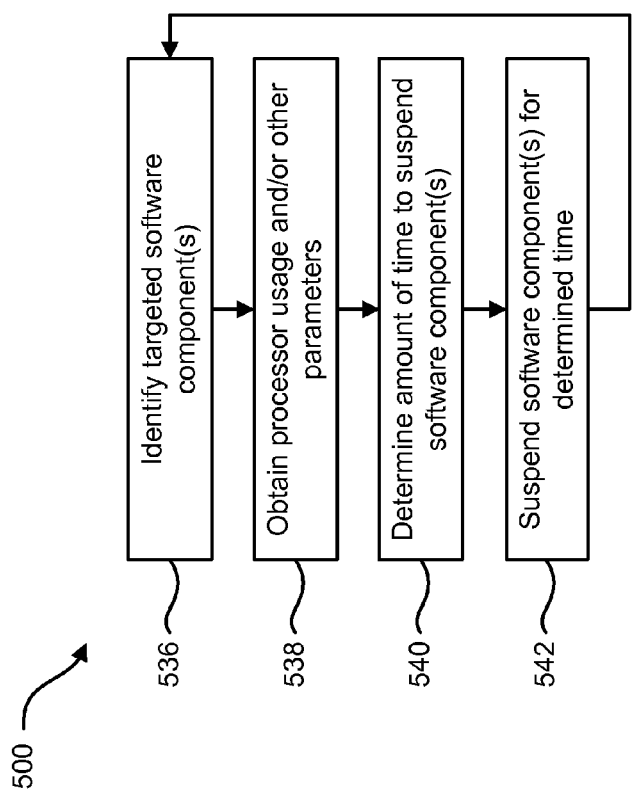
FIG. 5 is a flow diagram that illustrates a method for controlling processor usage on a computing device or managed node.

FIG. 5 is a flow diagram that illustrates one configuration of a method 500 for controlling processor usage on a computing device or managed node 112. A processor usage controller 120 may identify 536 targeted software component(s). For example, the processor usage controller 120 may enumerate the targeted process(es) 118 and the thread(s) 328, 330 within the targeted process(es) 118. However, the processor usage controller 120 may disregard user interface thread(s) 326 and/or high or "critical" priority threads 324. Software component(s) may be targeted software component(s) 118 if they include a processor usage controller 120 or if there is a processor usage controller 120 that can control the software component 118. Alternatively, the targeted software component(s) 118 may be designated by a user. The processor usage controller 120 may obtain 538 processor usage and/or other parameters. For example, the processor usage controller 120 may obtain 538 (e.g., sample) a current total processor usage of targeted software components 118 (e.g., processes) on the managed node 112. The processor usage controller 120 may obtain 538 other parameters, such as a computing device state (e.g., logged in, locked, in screen saver) and/or foreground user interface process identification.

The processor usage controller 120 may determine 540 an amount of time to suspend software component(s). For example, if the percentage of processor usage on the managed node 112 is above a threshold, the processor usage controller 120 may determine 540 a relatively longer amount of time to periodically suspend particular processes or threads. On the other hand, if the percentage of processor usage on the managed node 112 is below the threshold, the processor usage controller 120 may determine 540 a shorter amount of time to periodically suspend particular processes or threads. For example, particular processes or threads may be limited to a particular percentage of available processor resources. For instance, targeted software components 118 may be limited to 30% of available processor resources. However, if total processor usage on the managed node 112 goes above a threshold (e.g., 30%), then the targeted software components 118 may be limited to 3% of available processor resources, for example. This may continue until total processor usage drops below the threshold, at which point the targeted software components 118 may be allowed to use 30% of available processor resources.

The processor usage controller 120 may then periodically suspend 542 particular software components for the amount of time determined. On some operating systems (e.g., Microsoft® Windows), a debugger or other administrative privilege may need to be enabled to suspend certain software components. It may be noted, however, that this method may be generally applied to any preemptive operating system.

Figure 6:
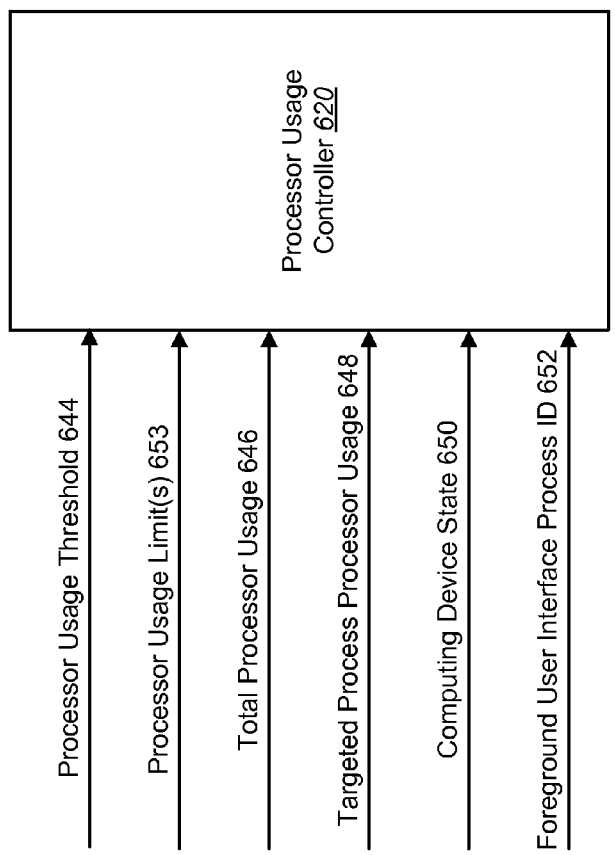
FIG. 6 is a block diagram that illustrates several inputs that may be used by a processor usage controller.

FIG. 6 is a block diagram that illustrates several inputs that may be used by a processor usage controller 620. Depending on its configuration, a processor usage controller 620 may use several inputs. A processor usage controller 620 may use a processor usage threshold 644, a processor usage limit 653, a total processor usage 646, a targeted process processor usage 648, a computing device state 650, and/or a foreground user interface process identification 652. A processor usage threshold 644 may be a usage threshold input by a user or computer support personnel via a user interface 106 or optionally a node user interface 116. The processor usage limit(s) 653 may be processor usage limits input by a user or computer support personnel via a user interface 106 or optionally a node user interface 116. For example, one "high" processor usage limit 653 may indicate an amount (e.g., percentage) of processor resources (e.g., total or currently available processor resources) that selected processes and/or threads may use when total processor usage 646 is above a threshold 644. A "regular" processor usage limit 653 may indicate an amount (e.g., percentage) of processor resources (e.g., total or currently available processor resources) that selected processes and/or threads may use when total processor usage 646 is below a threshold 644. A "low" processor usage limit 653 may indicate an amount (e.g., percentage) of processor resources to be used in certain circumstances (e.g., when the managed node 112 is in a low use state or a targeted process owns a foreground user interface). The processor usage threshold 644 may indicate a threshold such that if the processor usage on the managed node 112 is above the threshold, the processor usage controller 620 may more strictly limit the processor usage of particular software components; and if the processor usage is below the threshold, the processor usage controller 620 may less strictly limit the processor usage of the particular software components. It should be noted that even when the processor usage of the particular software components is below the threshold, the processor usage of those components may still be limited (e.g., according to a "regular" processor usage limit 653 to avoid the appearance of being a "processor hog" when a status is viewed in Microsoft® Windows task manager, for example). Processor usage may still be limited for scanning applications, for example. That is, the software components' processor usage may be limited according to a processor usage limit 653. The total processor usage 646 may be a sample of the current total processor usage (e.g., as a percent) on the managed node 112. The targeted process processor usage 648 may be sample(s) of the processor usage (e.g., a percent) of one or more targeted software components (e.g., process(es)). For example, the processor usage controller 620 may limit an individual process depending on that process' processor usage 648.

The processor usage controller 620 may control processor usage based on other parameters, such as computing device state 650 and foreground user interface process identification 652. For example, if the managed node 112 enters a low-use state (e.g., locked, logged off, or in screen saver), then the processor usage controller 620 may allow particular software components to consume more processing resources. This low-use state may indicate that a user is not currently using the computing device. The processor usage controller 620 may also control particular software components' processor usage depending on the foreground user interface process identification 652. For example, the processor usage controller 620 may allow the software components (e.g., process(es)) associated with the foreground user interface displayed on a managed node 112 to consume more processing resources. Optionally, the processor usage controller 620 may limit the amount of processing resources that may be consumed by other particular software components which are not associated with the foreground user interface displayed on a managed node 112.

Figure 7:
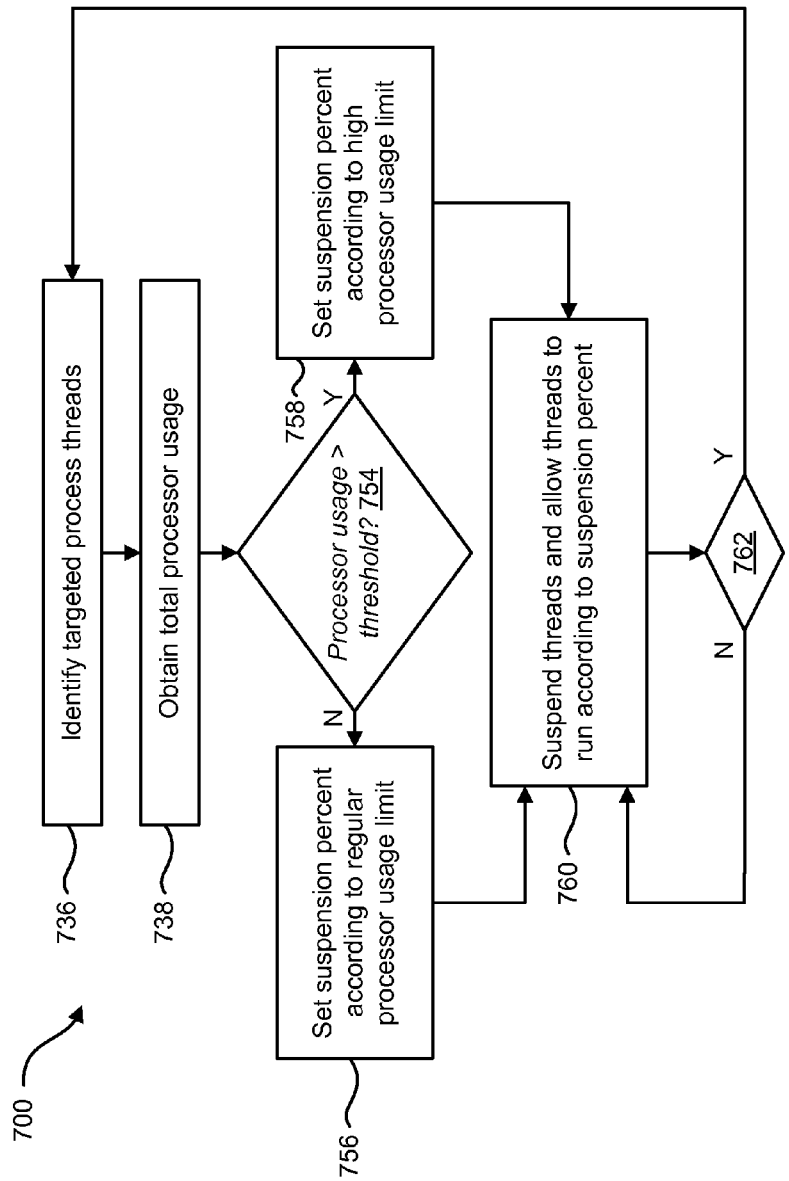
FIG. 7 is a flow diagram that illustrates one configuration of a method for controlling processor usage on a computing device or a managed node.

FIG. 7 is a flow diagram that illustrates one configuration of a method 700 for controlling processor usage on a computing device or a managed node 112. A processor usage controller 120 may identify 736 targeted process threads. For example, the processor usage controller 120 may identify threads included in the process in which the processor usage controller 120 resides, or it may identify threads in other designated processes (e.g., a user may designate a particular process). That is, the processor usage controller 120 may obtain a list of threads in or associated with a targeted process, including third-party threads 328. Furthermore, in identifying 736 targeted process threads, the processor usage controller 120 may disregard high or "critical" priority thread(s) 324, user interface thread(s) 326, other thread(s) 332, and the processor usage controller 120. For example, the processor usage controller 120 may not control threads that may make the managed node or its user interfaces appear to be "hung."

The processor usage controller 120 may obtain 738 a total processor usage 646 on a computing device. That is, the processor usage controller 120 may sample a current percentage of total processor usage. The processor usage controller 120 may determine 754 whether the total processor usage is greater than a specified threshold 644. If the total processor usage is greater than the threshold 644, the processor usage controller 120 may set 758 a suspension percent high (e.g., according to a high processor usage limit 653). This may be true even if the targeted process alone is not consuming enough processor resources for the total processor usage to be greater than the specified threshold. For example, if the threshold is set at 30%, the targeted process processor usage is 10% and the total processor usage is 33%, then the processor usage controller 120 may set 758 the suspension percent to 99%. The processor usage controller 120 may then suspend 760 the selected threads (i.e., high priority thread(s) 324 and user interface-associated thread(s) 326 excluded) for an amount of time equal to the suspension percent of a time interval and then allow the selected threads to run (e.g., resume) for the remainder of the time interval.

It should be noted that the time interval may be selected, for example, to be as small as possible without noticeably affecting the performance of the targeted processes. In other words, if an application is set to run a 50%, it may take twice as long to perform a task. As the interval gets smaller, however, the managed node 112 may "thrash" more (i.e., with the overhead of constantly suspending and resuming threads). Thus, the application may take more than twice as long to perform a task. In one configuration, the time interval may be set to 1 second. For example, if the time interval is 1 second and the suspension percent is 99%, then the processor usage controller 120 may suspend 760 the selected threads for 0.99 seconds and allow the threads to run for 0.01 seconds.

If the processor usage controller 120 determines 754 that the total processor usage is not greater than the threshold, then the processor usage controller 120 may set 756 the suspension percent according to a "regular" processor usage limit 653 (e.g., of available processing resources). For example, if the processor usage limit is set at 30% of available processing resources, then the processor usage controller 120 may set 756 the suspension percent to allow the selected threads to use 30% of available processing resources. The processor usage controller 120 may then suspend 760 the selected threads and allow them to run according to the suspension percent. On a multi-core processor, or in the case of an I/O intensive target application, the process may not approach an actual 30% (in this example) usage of the processor. However, I/O operations may make a computing device appear to be unresponsive, similar to when the processor is busy.

For example, if a processor is busy, then the selected threads may take longer to perform their tasks. For instance, the selected threads may be allowed to use 30% of the available processor. Without adjustments for how busy the processor currently is, the processor usage controller 120 would suspend all of the suspendable threads for 70% of a time interval and allow them to run for 30% of the time interval. On a fast processor, or a processor that is not as busy, the selected threads may run faster (e.g., and use more total processor capacity). On a busy processor, the selected threads may run slower, getting fewer instructions processed during the 30% work time per interval. Additionally, however, the total processor usage may be compared 754 to a threshold. When the total processor usage exceeds this value, the amount of run time allowed for the selected threads per interval may be reduced. For example, the amount of run time per interval may be reduced to a low value until processor usage recovers.

In this way, the processor usage controller 120 may be configured to allow selected processes and/or threads to use a percent of remaining available processing resources. Thus, the busier the processor becomes, the smaller fraction of processing resources will be taken by the selected processes and/or threads. In other words, this may not simply be a linear reduction based on the slower-running of all applications. Rather, it uses a smaller percentage of remaining processing resources if the processor is already busy. Hence, the processor usage controller 120 controls the selected processes and/or threads to jump to a low processor utilization (e.g., high suspension value) if the total processor usage has exceeded a processor usage threshold 644. Thus, if the selected processes and/or threads have a processor usage limit 653 of 30% of available processing resources, but the total processor usage 644 is already above 30%, the selected processes and/or threads drop to a low use (e.g., high suspension percent, 3% or $\frac{1}{10}^{th}$ of the processor usage limit 653, etc.) until total usage returns below 30%, for example.

Once the processor usage controller 120 has suspended 760 the selected threads for the suspension time and allowed the selected threads to run for the remainder of the time interval, the processor usage controller 120 may determine 762 whether its configuration/thread detection interval has elapsed. For example, the processor usage controller 120 may "pop up" at the beginning of each time interval and then again after the suspend period has passed (e.g., so all threads can be re-enabled). Then, the threads may be suspended until the next interval, when the processor usage controller may recalculate usage, etc., and/or search for any new threads that may have cropped up. That is, when the processor usage controller 120 determines 762 that the its configuration/thread detection interval has elapsed, it may return to identify 736 targeted process threads, otherwise, it may return to suspend 760 and resume the selected threads for another time interval.

Figure 8:
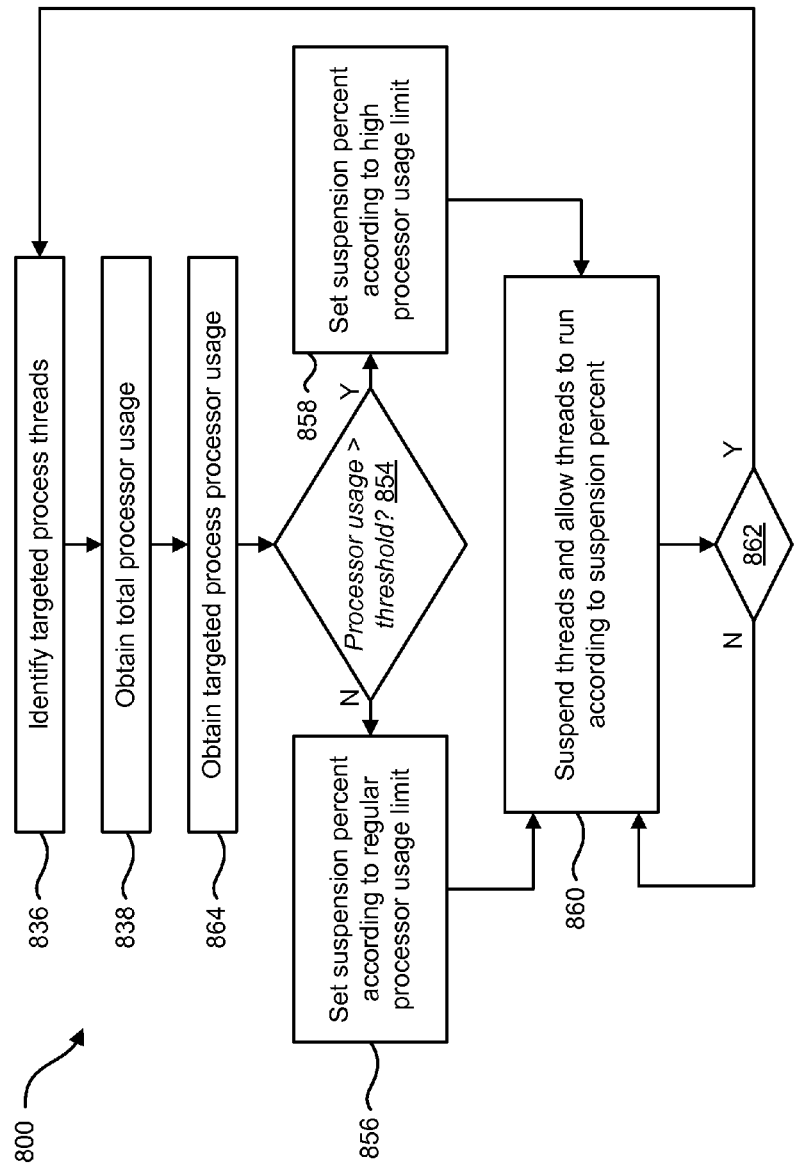
FIG. 8 is a flow diagram that illustrates another configuration of a method for controlling processor usage on a computing device.

FIG. 8 is a flow diagram that illustrates another configuration of a method 800 for controlling processor usage on a computing device. A processor usage controller 120 may identify 836 targeted process threads, including third-party threads 328, while disregarding high or "critical" priority 324 and user interface-associated threads 326. The processor usage controller 120 may obtain 838 a total processor usage 646 on a computing device. The processor usage controller 120 may also obtain 864 targeted process(es) processor usage 648. The processor usage controller 120 may determine 854 whether the total processor usage is greater than a specified threshold 644. If the total processor usage is greater than the threshold 644, the processor usage controller 120 may set 858 a suspension percent high (e.g., according to a high processor usage limit 653). For example, if the threshold is set at 30% and the total processor usage is 33%, then the processor usage controller 120 may set 858 the suspension percent to 99% (e.g., in order to reduce processor usage for a targeted process until processor usage is reduced below the threshold). Alternatively, the suspension percent may be linearly reduced by an amount that the processor has exceeded a given threshold or limit. For example, the processor usage controller may control a linear usage drop to 1% as the process usage goes from the threshold to 100%, though never going to 0. For example, the processor usage may be reduced according to Equation (1) after the total processor usage threshold 644 has been exceeded.

$$100 * \frac{(100\% - \text{Total\_Usage}_\%)}{(100\% - \text{Threshold}_\%)} = M_\% \quad (1)$$

$$\text{Usage} = M_\% * \text{Usage\_Limit}_\%$$

If Usage < 1%, Usage = 1%

Total_Usage is the sampled total processor usage 646, Threshold$_\%$ is the processor usage threshold 644, M$_\%$ is a multiplier, Usage is resulting processor usage and Usage_Limit$_\%$ is the processor usage limit 653. Thus, in this example, the suspension percent may be set according to Usage, which may be computed according to a processor usage limit 653. The processor usage controller 120 may then suspend 860 the selected threads and allow the selected threads to run according to the suspension percent.

If the processor usage controller 120 determines 854 that the total processor usage is not greater than the threshold, then the processor usage controller 120 may set 856 the suspension percent according to a "regular" processor usage limit 653. The processor usage controller 120 may then suspend 860 threads and allow threads to run according to the suspension percent and then allow the selected threads to run for the remainder of the time interval. Once the processor usage controller 120 has suspended 860 the selected threads and allowed the selected threads to run for the time interval, the processor usage controller 120 may determine 862 whether its configuration/thread detection interval has elapsed. When the processor usage controller 120 determines that the its configuration/thread detection interval has elapsed, it may return to identify 836 targeted process threads, otherwise, it may return to suspend 860 and resume the selected threads for another time interval.

Figure 9:
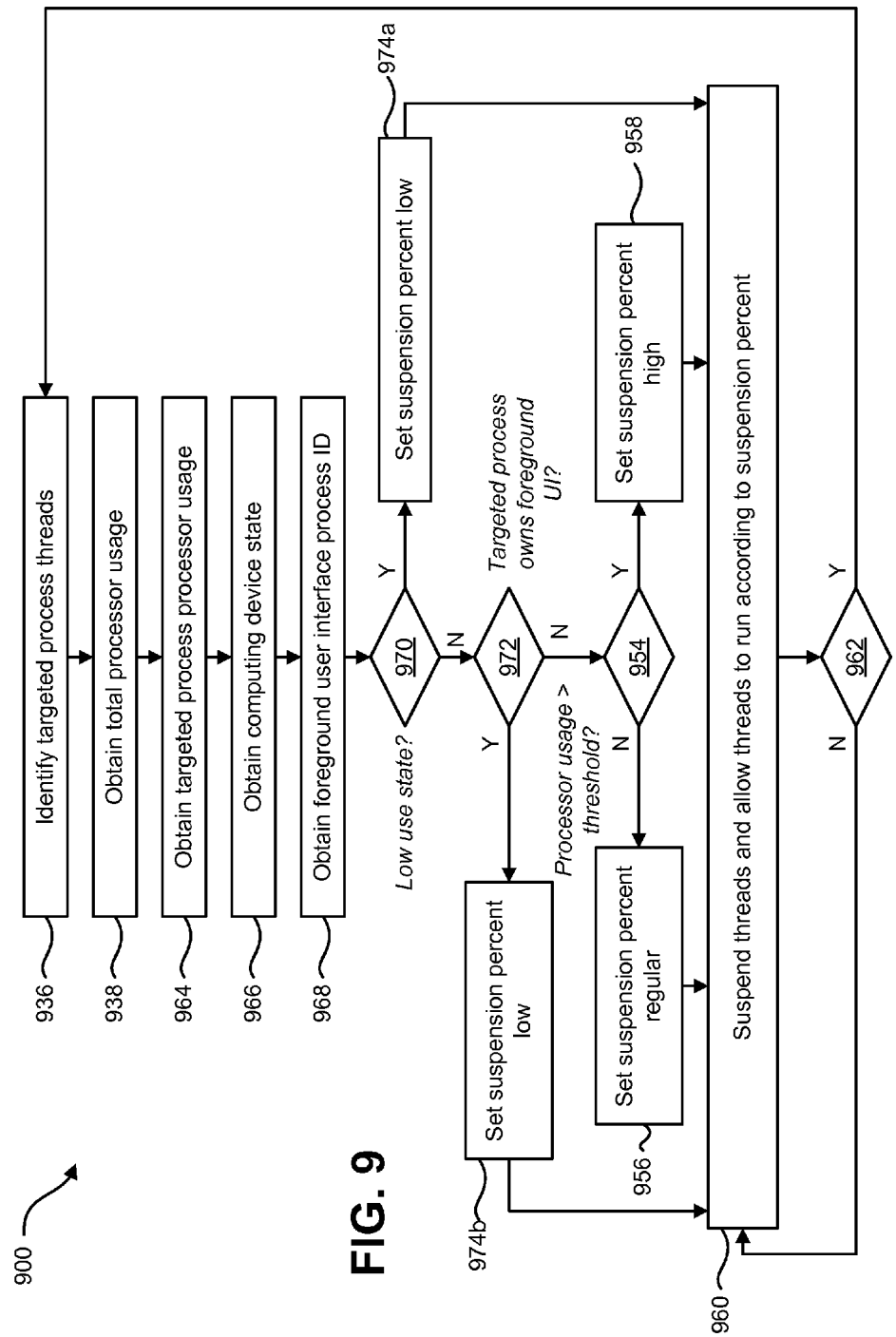
FIG. 9 is a flow diagram that illustrates another configuration of a method for controlling processor usage on a computing device.

FIG. 9 is a flow diagram that illustrates another configuration of a method 900 for controlling processor usage on a computing device. A processor usage controller 120 may identify 936 targeted process threads, including third-party threads 328, while disregarding high priority 324 and user interface-associated threads 326. The processor usage controller 120 may obtain 938 a total processor usage 646 on a computing device. The processor usage controller 120 may obtain 964 targeted process(es) processor usage 648. The processor usage controller 120 may obtain 966 a computing device state 650. For example, the processor usage controller 120 may obtain the state of the managed node 112. For example, the managed node 112 may be in a low-use state, where the managed node 112 is locked, running a screen saver or where the user has logged off. On the other hand, the user may be currently using the managed node 112. The processor usage controller 120 may also obtain 968 the foreground user interface process identification 652. For example, the processor usage controller 120 may obtain 968 the identification of the process that is associated with a user interface (e.g., "window") that is currently in the foreground on the managed node 112.

The processor usage controller 120 may determine 970 whether the computing device is in a low-use state. For example, if the managed node 112 is running a screen saver, is locked, or the user is logged off, then the processor usage controller 120 may set 974a the suspension percent low or according to a "low" processor usage limit 653. For example, the processor usage controller 120 may set the suspension percent to 0%, in effect allowing the selected threads to run without limitation. If the processor usage controller 120 is not in a low-use state (e.g., the user is logged in, the managed node 112 is not in a screen saver and is not locked), then the processor usage controller 120 may determine 972 whether the targeted process is associated with the foreground user interface. If the targeted process is associated with the foreground user interface, then the processor usage controller 120 may set 974b the suspension percent low or according to a "low" processor usage limit 653. For example, the processor usage controller 120 may set 974b the suspension percent to 0%, in effect allowing the selected threads to run without limitation. This determination 972 may allow an application that has two modes (e.g., a "silent" mode and a user interface mode) to use more processing resources when the application is in user interface mode and has its user interface in the foreground. However, if the application is running in a "silent" mode, then its processor usage may be more controlled. It should be noted that module 974*a* and module 974*b* may set different suspension percentages.

If the processor usage controller 120 determines 972 that the targeted process is not associated with the foreground user interface, then it may determine 954 whether the total processor usage 646 is greater than the threshold. If the total processor usage is greater than the threshold, the processor usage controller 120 may set 958 a suspension percent high (e.g., according to a "high" processor usage limit 653). The processor usage controller 120 may then suspend 960 the selected threads and allow threads to run according to the suspension percent. If the processor usage controller 120 determines 954 that the total processor usage is not greater than the threshold, then the processor usage controller 120 may set 956 the suspension according to a "regular" processor usage limit 653. The processor usage controller 120 may then suspend 960 the selected threads and allow threads to run according to the suspension percent. Once the processor usage controller 120 has suspended 960 the selected threads and allowed the selected threads to run, the processor usage controller 120 may determine 962 whether its configuration/thread detection interval has elapsed. When the processor usage controller 120 determines that its configuration/thread detection interval has elapsed, it may return to identify 936 targeted process threads.

Figure 10:
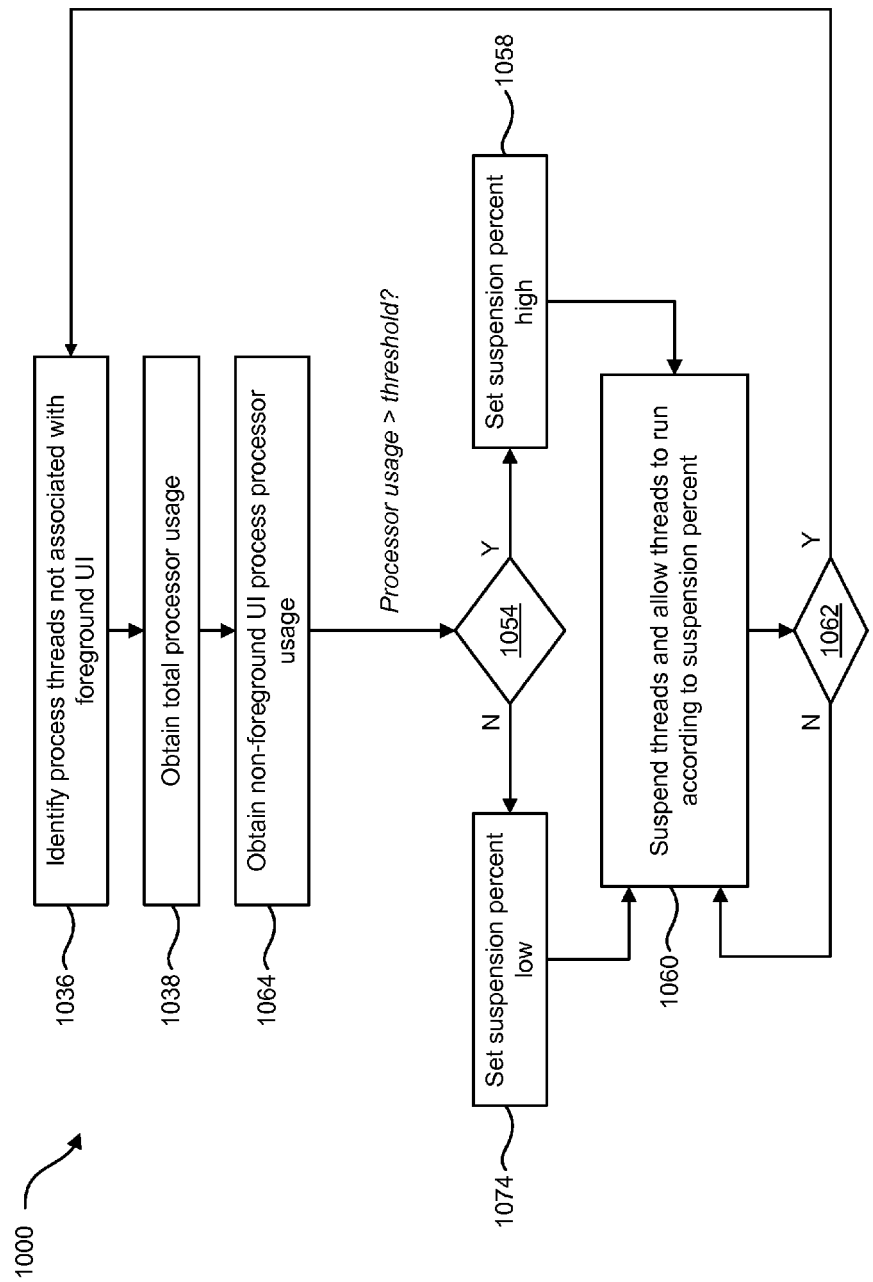
FIG. 10 is a flow diagram that illustrates another configuration of a method for controlling the processor usage on a computing device.

FIG. 10 is a flow diagram that illustrates another configuration of a method 1000 for controlling the processor usage on a computing device. A processor usage controller 120 may identify 1036 targeted process threads not associated with a foreground user interface (e.g., by finding all of the process threads not associated with the foreground user interface process identification 652). The processor usage controller 120 may obtain 1038 a total processor usage 646 on a computing device. The processor usage controller 120 may obtain 1064 the non-foreground user interface process(es) processor usage 648. The processor usage controller may determine 1054 whether the total processor usage 646 is greater than the threshold. If the total processor usage is greater than the threshold, the processor usage controller 120 may set 1058 a suspension percent high (e.g., according to a "high" processor usage limit 653). For example, the processor usage controller 120 may set the suspension percent to 99%, and then suspend 1060 the selected threads and allow the threads to run according to the suspension percent. In effect, this may allow the process associated with the foreground user interface to consume more processor resources, while background processes are consuming less processor resources. If the processor usage controller 120 determines 1054 that the total processor usage is not greater than the threshold, then the processor usage controller 120 may set 1074 the suspension percent low or according to a "low" processor usage limit 653. For example, the processor usage controller 120 may set 1074 the suspension percent to 0%, thereby essentially allowing the threads not associated with the foreground user interface to run without a limit. The processor usage controller 120 may then suspend 1060 the selected threads and allow the selected threads to run according to the suspension percent.

Alternatively, the processor usage controller 120 may determine 1054 whether the processor usage for each process is greater than an average process processor usage. For example, the processor usage controller 120 may determine an average processor usage based on all of the selected processes currently running. If an individual process processor usage is greater than the average process processor usage, then the processor usage controller 120 may set 1058 the suspension percent for that individual process high (e.g., 99%, according to a "high" processor usage limit 653), optionally according to a "regular" processor usage limit 653, or optionally based on the average. However, if an individual process processor usage is not greater than the average, the processor usage controller 120 may set 1074 the suspension percent for that individual process low (e.g., 0%, according to a "low" processor usage limit), optionally based on the threshold or optionally based on the average. Once the processor usage controller 120 has set 1074, 1058 the suspension percent for each process, then the processor usage controller may suspend 1060 threads for the suspension percent associated with the thread's process. Once the processor usage controller 120 has suspended 1060 the selected threads and/or allowed the selected threads to run for the time interval, the processor usage controller 120 may determine 1062 whether its configuration/thread detection interval has elapsed. When the processor usage controller 120 determines 1062 that its configuration/thread detection interval has elapsed, it may return to identify 1036 process threads not associated with the foreground user interface.

Figure 11:
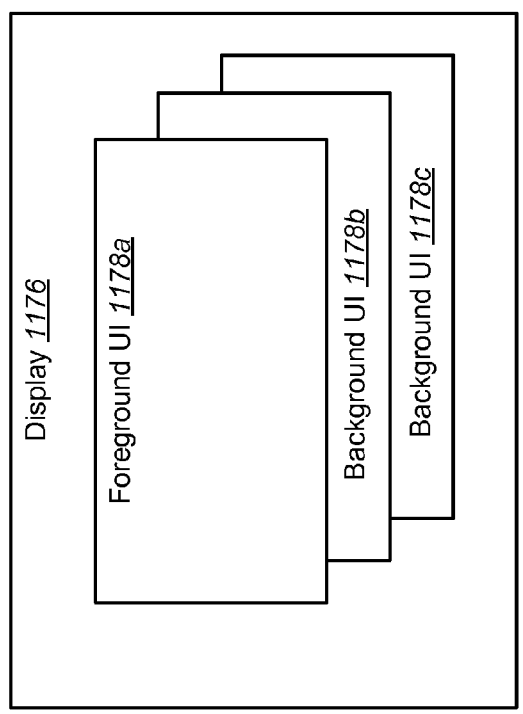
FIG. 11 is a block diagram that illustrates a display and several user interfaces.

FIG. 11 is a block diagram that illustrates a display and several user interfaces. A managed node 112 may include a display 1176. The display may show several user interfaces 1178*a-c*. A user interface may be a foreground user interface 1178*a*. That is, it may appear to "cover" other background user interfaces 1178*b-c*, or be in a "focused" state. The background user interfaces 1178*b-c* may not be in a "focused" state, and may be "covered" if they overlap with the foreground user interface 1178*a*. The processor usage controller 620 may use this information in differing manners. For example, the processor usage controller 620 may disregard threads that are associated with user interfaces 1178*a-c* when identifying 736 threads. In another configuration, the processor usage controller 620 may set 974*b* the suspension percent low or optionally based on the threshold for process threads associated with the process that is associated with or "owns" a foreground user interface 1178*a*. This may allow more processor resources for a process that is associated with a user interface that a user is currently interacting with. The processor usage controller 620 may also limit processor usage for process threads that are not associated with the foreground user interface 1178*a*. This may allow more processor resources for a process that a user is currently using.

Figure 12:
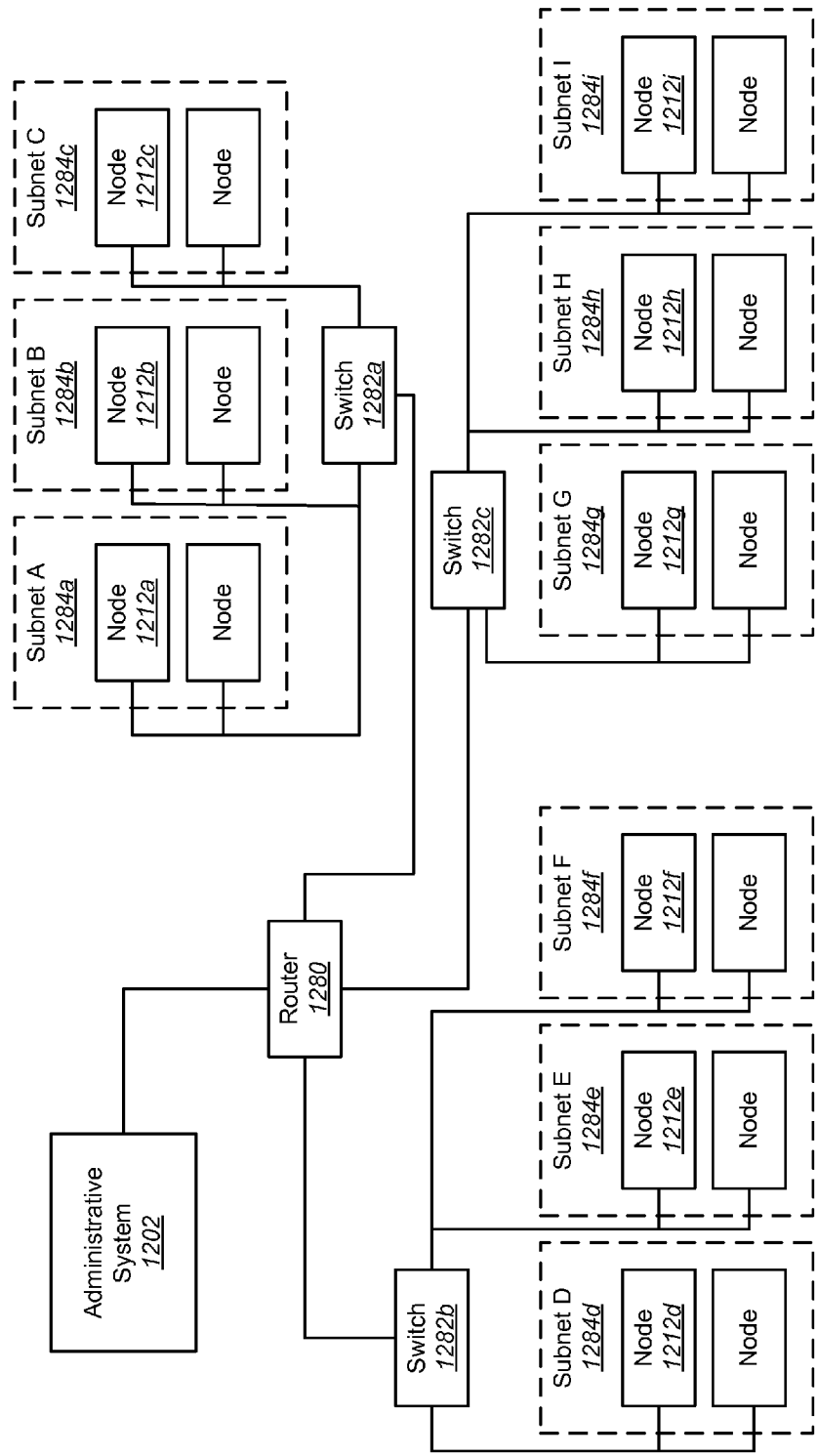
FIG. 12 is a block diagram that illustrates one configuration of a network where a system for controlling processor usage on a computing device may be implemented.

FIG. 12 is a block diagram that illustrates one configuration of a network where a system for controlling processor usage on a computing device may be implemented. An administrative system 1202 is connected to a router 1280. The router 1280 is connected to switches 1282*a*, 1282*b*, 1282*c*. The switch 1282*a* is connected to several nodes 1212*a*, 1212*b*, 1212*c*, etc. via their respective subnets 1284*a*, 1284*b*, 1284*c*. The switch 1282*b* is connected to several nodes 1212*d*, 1212*e*, 1212*f*, etc. via their respective subnets 1284*d*, 1284*e*, 1284*f*. The switch 1282*c* is connected to several nodes 1212*g*, 1212*h*, 1212*i*, etc. via their respective subnets 1284*g*, 1284*h*, 1284*i*. Although FIG. 12 only shows one router 1280, and a limited number of switches 1282, subnets 1284, and nodes 1212, many and varied numbers of routers 1280, switches 1282, subnets 1284, and nodes 1212 may be included in networks and/or systems where a system for controlling processor usage on a computing device may be implemented.

Figure 13:
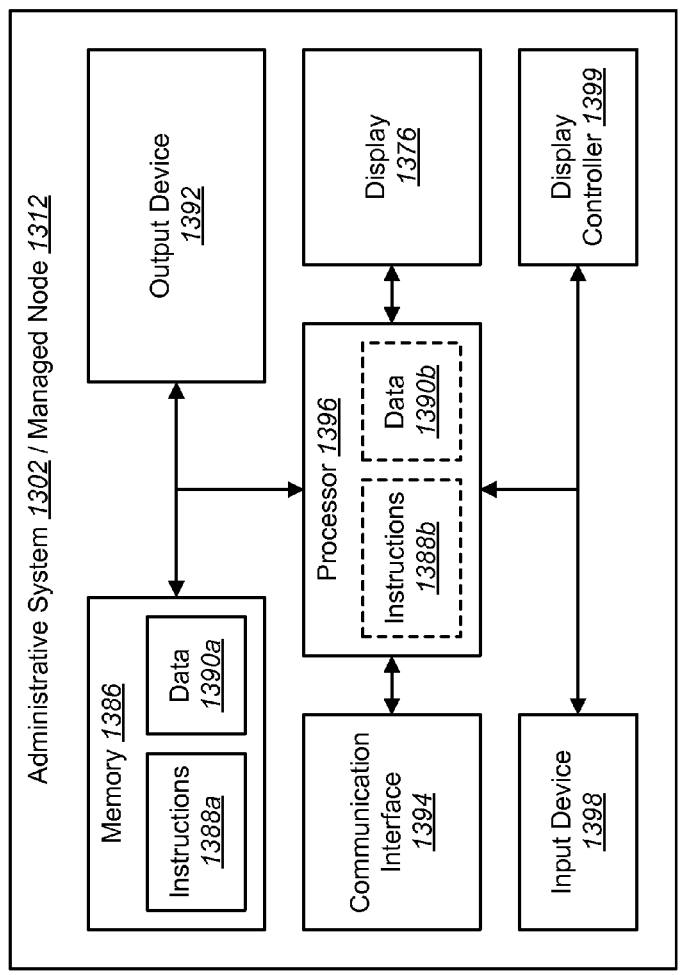
FIG. 13 illustrates various components of a computing device.

FIG. 13 illustrates various components that may be utilized in an administrative system 1302 and/or a managed node 1312. The illustrated components may be located within the same physical structure or in separate housings or structures.

The administrative system 1302 and/or managed node 1312 may include a processor 1396 and memory 1386. The memory 1386 may include instructions 1388a and data 1390a. The processor 1396 controls the operation of the administrative system 1302 and/or managed node 1312 and may be, for example, a microprocessor, a microcontroller, a digital signal processor (DSP) or other device known in the art. The processor 1396 typically performs logical and arithmetic operations based on program instructions 1388b and/or data 1390b stored from the memory 1386.

The administrative system 1302 and/or managed node 1312 typically may include one or more communication interfaces 1394 for communicating with other electronic devices. The communication interfaces 1394 may be based on wired communication technology, wireless communication technology, or both. Examples of different types of communication interfaces 1394 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The administrative system 1302 and/or managed node 1312 typically may include one or more input devices 1398 and one or more output devices 1392. Examples of different kinds of input devices 1398 include a keyboard, mouse, microphone, remote control device, button, joystick, trackball, touchpad, lightpen, etc. Examples of different kinds of output devices 1392 include a speaker, printer, etc. One specific type of output device which may be typically included in a computer system is a display device 1376. Display devices 1376 used with configurations disclosed herein may utilize any suitable image projection technology, such as a cathode ray tube (CRT), liquid crystal display (LCD), light-emitting diode (LED), gas plasma, electroluminescence, or the like. A display controller 1399 may also be provided, for converting data stored in the memory 1386 into text, graphics, and/or moving images (as appropriate) shown on the display device 1376.

Of course, FIG. 13 illustrates only one possible configuration of an administrative system 1302 and/or managed node 1312. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for controlling processor usage on a computing device, comprising:
    identifying targeted processes on a computing device;
    obtaining a total processor usage for a processor on the computing device;
    determining, on the computing device, an amount of suspension percent time to suspend threads within the targeted processes based on one or more processor usage limits, wherein the amount of suspension percent time to suspend the threads is based on a regular processor usage limit if the total processor usage is not greater than a threshold and is based on a high processor usage limit if the total processor usage is greater than a threshold;
    maintaining without suspension, on the computing device, high priority threads within the targeted processes; and
    suspending, on the computing device, remaining threads for the amount of suspension percent time;
    wherein determining the amount of suspension percent time to suspend the threads is based on a processor usage limit, whether the computing device is in a low-use state and whether the total processor usage is greater than a threshold.

2. The method of claim 1, further comprising maintaining without suspension, on the computing device, threads that are associated with a user interface.

3. The method of claim 1, further comprising obtaining a processor usage of the targeted processes.

4. The method of claim 3, wherein the amount of suspension percent time to suspend the threads is further based on the processor usage of the targeted processes if the total processor usage is not greater than a threshold.

5. The method of claim 1, further comprising determining, on the computing device, whether the computing device is in a low-use state.

6. The method of claim 1, further comprising obtaining, on the computing device, a process identification of a foreground user interface.

7. The method of claim 6, wherein determining the amount of suspension percent time to suspend the threads is further based on whether the threads are associated with the foreground user interface and whether the total processor usage is greater than a threshold.

8. The method of claim 1, wherein the targeted processes are not associated with a foreground user interface.

9. The method of claim 8, wherein determining the amount of suspension percent time to suspend the threads is further based on whether the total processor usage is greater than a threshold.

10. The method of claim 1, wherein the threads comprise third-party threads.

11. A computing device that is configured for controlling processor usage on a computing device, comprising:
    a processor;
    memory in electronic communication with the processor;
    instructions stored in the memory, the instructions being executable to:
        identify targeted processes;
        obtain a total processor usage for the processor;
        determine an amount of suspension percent time to suspend threads within the targeted processes based on one or more processor usage limits, wherein the amount of suspension percent time to suspend the threads is based on a regular processor usage limit if the total processor usage is not greater than a threshold and is based on a high processor usage limit if the total processor usage is greater than a threshold;
        maintain without suspension, on the computing device, high priority threads within the targeted processes; and
        suspend remaining threads for the amount of suspension percent time;
        wherein determining the amount of suspension percent time to suspend the threads is based on a processor usage limit, whether the computing device is in a low-use state and whether the total processor usage is greater than a threshold.

12. The computing device of claim 11, wherein the instructions are further executable to maintain without suspension threads that are associated with a user interface.

13. The computing device of claim 11, wherein the instructions are further executable to obtain a processor usage of the targeted processes.

14. The computing device of claim 13, wherein the amount of suspension percent time to suspend the threads is further based on the processor usage of the targeted processes if the total processor usage is not greater than a threshold.

15. The computing device of claim 11, wherein the instructions are further executable to determine whether the computing device is in a low-use state.

16. The computing device of claim 11, wherein the instructions are further executable to obtain a process identification of a foreground user interface.

17. The computing device of claim 16, wherein determining the amount of suspension percent time to suspend the threads is further based on whether the threads are associated with the foreground user interface and whether the total processor usage is greater than a threshold.

18. The computing device of claim 11, wherein the targeted processes are not associated with a foreground user interface.

19. The computing device of claim 18, wherein determining the amount of suspension percent time to suspend the threads is further based on whether the total processor usage is greater than a threshold.

20. The computing device of claim 11, wherein the threads comprise third-party threads.

21. A non-transitory tangible computer-readable medium for controlling processor usage on a computing device comprising executable instructions for:
    identifying targeted processes;
    obtaining a total processor usage for the processor;
    determining an amount of suspension percent time to suspend threads within the targeted processes based on one or more processor usage limits, wherein the amount of suspension percent time to suspend the threads is based on a regular processor usage limit if the total processor usage is not greater than a threshold and is based on a high processor usage limit if the total processor usage is greater than a threshold;
    maintaining without suspension, on the computing device, high priority threads within the targeted processes; and
    suspending remaining threads for the amount of suspension percent time;
    wherein determining the amount of suspension percent time to suspend the threads is based on a processor usage limit, whether the computing device is in a low-use state and whether the total processor usage is greater than a threshold.

* * * * *